US010661918B2

(12) United States Patent
Schwarz et al.

(10) Patent No.: US 10,661,918 B2
(45) Date of Patent: May 26, 2020

(54) SELF-ASSEMBLING PERSISTENT SPACE PLATFORM

(71) Applicant: Space Systems/Loral, LLC, Palo Alto, CA (US)

(72) Inventors: Robert Erik Schwarz, Los Gatos, CA (US); Robert Edward Helmer, Pleasanton, CA (US); Paul Anthony Briggs, San Francisco, CA (US); John Douglas Lymer, Mountain View, CA (US); Alfred Heikal Tadros, Los Altos, CA (US); Andrew E. Turner, Mountain View, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 457 days.

(21) Appl. No.: 15/689,993

(22) Filed: Aug. 29, 2017

(65) Prior Publication Data

US 2018/0093786 A1 Apr. 5, 2018

Related U.S. Application Data

(60) Provisional application No. 62/404,113, filed on Oct. 4, 2016, provisional application No. 62/506,522, filed on May 15, 2017.

(51) Int. Cl.
*B64G 4/00* (2006.01)
*B64G 1/10* (2006.01)
(Continued)

(52) U.S. Cl.
CPC .............. *B64G 1/10* (2013.01); *B64G 1/002* (2013.01); *B64G 1/1078* (2013.01); *B64G 1/222* (2013.01);
(Continued)

(58) Field of Classification Search
CPC ...... B64G 1/222; B64G 1/443; B64C 2211/00; H01Q 1/28
See application file for complete search history.

(56) References Cited

U.S. PATENT DOCUMENTS 4,725,025 A 2/1988 Binge et al.
4,832,113 A 5/1989 Mims et al.
(Continued)

FOREIGN PATENT DOCUMENTS

EP 0 541 052 A1 5/1993
JP H05 278695 A 10/1993
(Continued)

OTHER PUBLICATIONS

OrbitalATK.com, "CIRAS, The Commercial Infrastructure for Robotic Assembly and Services, Fact Sheet," FS003 17 OA 7485, 2017, 2 pages.

(Continued)

*Primary Examiner* — Brian M O'Hara
(74) *Attorney, Agent, or Firm* — Weaver Austin Villeneuve & Sampson LLP

(57) ABSTRACT

A spacecraft includes a plurality of deployable module elements, at least one of the deployable module elements including a robotic manipulator, the spacecraft being reconfigurable from a launch configuration to an on-orbit configuration. In the launch configuration, the deployable module elements are disposed in a launch vehicle in a first arrangement. In the on-orbit configuration, the deployable module elements are disposed in a second configuration. The spacecraft is self-assembled by the robotic manipulator reconfiguring the spacecraft from the launch configuration, through a transition configuration, to the on-orbit configuration. The deployable module elements may be in a stacked
(Continued)

arrangement in the launch configuration and may be in a side-by-side arrangement in the on-orbit configuration.

14 Claims, 15 Drawing Sheets

(51) Int. Cl.
 *B64G 1/00* (2006.01)
 *B64G 1/22* (2006.01)
 *B64G 1/64* (2006.01)
(52) U.S. Cl.
 CPC ............... *B64G 1/64* (2013.01); *B64G 1/646* (2013.01); *B64G 4/00* (2013.01); *B64G 2001/1092* (2013.01); *B64G 2004/005* (2013.01)

(56) References Cited

U.S. PATENT DOCUMENTS

| | | | |
|---|---|---|---|
| 5,052,640 A * | 10/1991 | Chang | B64G 1/002 136/292 |
| 5,114,101 A * | 5/1992 | Stern | B64G 1/222 244/172.8 |
| 5,145,130 A | 9/1992 | Purves | |
| 5,527,001 A * | 6/1996 | Stuart | B64G 1/66 244/159.4 |
| 5,644,322 A | 7/1997 | Hayes et al. | |
| 5,785,280 A * | 7/1998 | Baghdasarian | B64G 1/222 136/245 |
| 6,448,940 B1 | 9/2002 | Chiang | |
| 6,568,638 B1 * | 5/2003 | Capots | B64G 1/10 244/159.4 |
| 7,598,922 B2 | 10/2009 | Brooks et al. | |
| 7,714,797 B2 * | 5/2010 | Couchman | B64G 1/66 343/881 |
| 8,448,902 B2 | 5/2013 | Gelon | |
| 8,550,407 B2 | 10/2013 | Vezain et al. | |
| 8,789,796 B2 | 7/2014 | Boccio | |
| 2006/0105706 A1 | 5/2006 | Huang et al. | |
| 2009/0282646 A1 | 11/2009 | Baudasse et al. | |
| 2016/0264264 A1 | 9/2016 | Helmer et al. | |
| 2016/0322710 A1 * | 11/2016 | Grosroyat | H01Q 1/08 |
| 2018/0201393 A1 * | 7/2018 | Johns | B64G 1/002 |

FOREIGN PATENT DOCUMENTS

JP 2004196080 A 7/2004
WO WO 2016/144884 A1 9/2016

OTHER PUBLICATIONS

U.S. Appl. No. 15/160,258, filed May 20, 2016, Helmer et al.
Extended European Search Report dated Mar. 3, 2018 for EP Application No. 17192203.2.

* cited by examiner

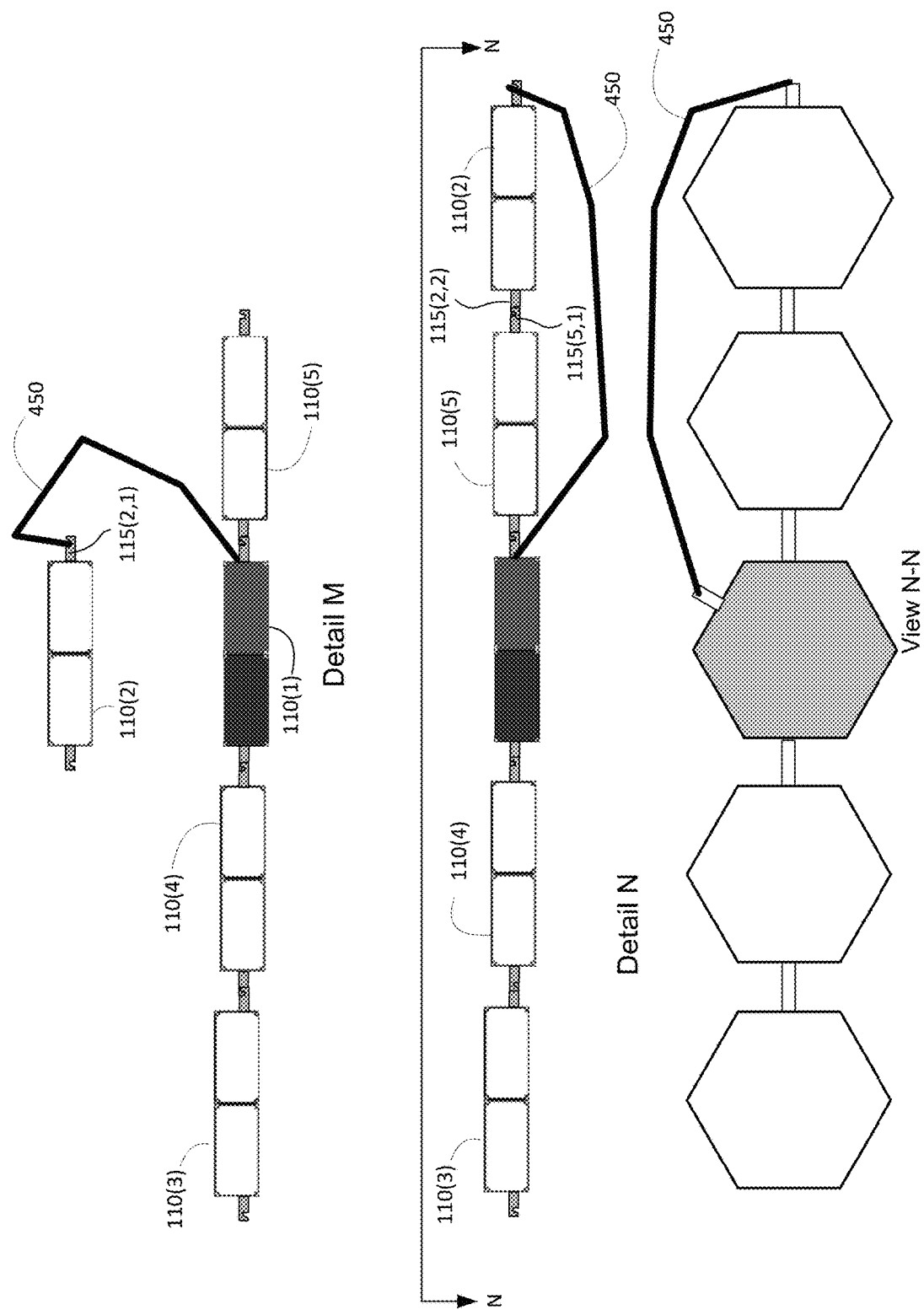

Detail R

View R1-R1

Detail S

View S1-S1

SELF-ASSEMBLING PERSISTENT SPACE PLATFORM

CROSS-REFERENCE TO RELATED APPLICATIONS

This disclosure claims priority to U.S. Provisional Patent Application No. 62/404,113, filed Oct. 4, 2016, entitled "SELF-ASSEMBLING PERSISTENT SPACE PLATFORM", and to U.S. Provisional Patent Application No. 62/506,522, filed May 15, 2017, entitled "CONDOMINIUM SPACECRAFT INFRASTRUCTURE", each assigned to the assignee hereof, the disclosures of which are hereby incorporated by reference in its entirety into this Patent Application for all purposes.

TECHNICAL FIELD

This invention relates generally to communications satellites, and more particularly to on-orbit assembly and reconfiguration of a persistent space platform.

BACKGROUND

The assignee of the present invention designs and manufactures spacecraft for, inter alia, communications and broadcast services. Many satellite services are provided from spacecraft in geosynchronous orbit (GEO), an orbit having a semi-major axis of 42,164 kilometers and an orbital period of one sidereal day of (23 hr. 56 min. 4 seconds, the period of rotation of Earth in inertial space). Because longitudes ("slots") at which spacecraft may be stationed in GEO (i.e., available locations on the GEO "arc") are limited, there is a strong market demand to maximize the revenue generated from each slot. As a result, many satellites disposed in GEO have grown increasingly larger, more complex and expensive, with satellite operators demanding higher power, and more payload throughput, and multipayload spacecraft. The cost to acquire such a satellite, including launch and insurance, can represent a substantial barrier to entry for those wishing to provide space based services.

Launch vehicle compatibility is a second requirement faced by a spacecraft designer. The increased performance requirements are only advantageously met if compatibility with conventional, commercially available launch vehicles is maintained. Accordingly, a spacecraft, as configured for launch, is desirably made compatible with fairing envelope constraints of such launch vehicles as, for example, Ariane V, Atlas XEPF, Proton, and Falcon 9. As a result, it is very often a requirement to reconfigure a spacecraft from a launch configuration to an on-orbit configuration. Some techniques related to this requirement are disclosed in U.S. Pat. Nos. 5,644,322, 6,448,940, 8,789,796 and 8,448,902, assigned to the assignee of the present disclosure, and in U.S. patent application Ser. Nos. 14/642,486 and 15/160,258, assigned to the assignee of the present disclosure, the disclosures of which are hereby incorporated by reference into the present disclosure in their entirety for all purposes.

Modern GEO spacecraft are also required to reliably operate on-orbit for 15 years or more, however changes in payload technology and market demands may result in obsolescence of a payload well before the spacecraft bus equipment reaches end-of-life.

SUMMARY

According to some implementations, a spacecraft includes a plurality of deployable module elements, at least one of the deployable module elements including a robotic manipulator, the spacecraft being reconfigurable from a launch configuration to an on-orbit configuration. In the launch configuration, the deployable module elements are disposed in a launch vehicle in a first arrangement. In the on-orbit configuration, the deployable module elements are disposed in a second arrangement. The spacecraft is self-assembled by the robotic manipulator reconfiguring the spacecraft from the launch configuration, through a transition configuration, to the on-orbit configuration.

In some examples, in the launch configuration, the deployable module elements may be in a stacked arrangement; and in the on-orbit configuration, the deployable module elements may be in a side-by-side arrangement.

In some examples, in the launch configuration, adjacent ones of the deployable module elements may be releasably coupled with a releasable coupling, in the on-orbit configuration, the adjacent ones of the deployable module elements may be releasably coupled with a second releasable coupling, different from the first releasable coupling, and in the transition configuration, both the first releasable coupling and the second releasable coupling may be released.

In some examples, at least one of the deployable module elements may be a persistent bus services module.

In some examples, at least one of the deployable module elements may be a propulsion module.

In some examples, at least two of the deployable module elements may be replaceable payload modules.

According to some implementations, a method includes self-assembling an orbiting spacecraft from a launch configuration to an on-orbit configuration and operating the orbiting spacecraft in the on-orbit configuration. In the launch configuration, a plurality of deployable module elements are disposed in a launch vehicle in a stacked arrangement. In the on-orbit configuration, the deployable module elements are disposed in a side-by-side arrangement. At least one of the deployable module elements includes a robotic manipulator operable to reconfigure the spacecraft from the launch configuration, through a transition configuration, to the on-orbit configuration.

In some examples, self-assembling the orbiting spacecraft may include using the robotic manipulator to reconfigure the spacecraft from the launch configuration, through the transition configuration, to the on-orbit configuration.

In some examples, in the stacked arrangement, adjacent ones of the deployable module elements may be releasably coupled with a first releasable coupling, in the side-by-side arrangement, the adjacent ones of the deployable module elements may be releasably coupled with a second releasable coupling, and, in the transition configuration, both the first releasable coupling and the second releasable coupling may be released.

According to some implementations, a method includes operating an earth orbiting persistent infrastructure module and providing bus services from the infrastructure module to one or more replaceable payload modules. The infrastructure module is detachably coupled with the one or more replaceable payload modules. The bus services include one or more of power, telemetry, command, attitude control and orbit control. The providing bus services is performed under a contract between a first owner/operator of the infrastructure module and a second owner/operator of at least one of the one or more payload modules.

In some examples, the infrastructure module may be deployed into space at a substantially earlier time than at least one of the one or more payload modules.

In some examples, the infrastructure module may be detachably coupled with at least a first replaceable payload module and a second replaceable payload module.

In some examples, the infrastructure module may be configured to operate in a geosynchronous orbit.

In some examples, the infrastructure module and at least one of the one or more replaceable payload modules may be owned/operated by the first owner/operator.

According to some implementations, a system includes a payload for a launch vehicle, the payload including a robotic manipulator and a payload stack including one or more deployable module elements and a plurality of spacecraft including at least a first spacecraft and a second spacecraft. At least a first portion of the second spacecraft is disposed, in a launch configuration, forward of the first spacecraft. At least one of the deployable module elements is disposed, in the launch configuration, in an upper portion of the payload stack, forward of the first portion of the second spacecraft. The robotic manipulator is operable to reconfigure the payload from the launch configuration, through a transition configuration, to an on-orbit configuration. In the on-orbit configuration, the at least one deployable module is coupled with the first spacecraft.

In some examples, at least one of the first spacecraft and the second spacecraft may have a first characteristic width transverse to a longitudinal axis of the launch vehicle, the at least one deployable module elements may have second characteristic width transverse to the longitudinal axis of the launch vehicle, and the first characteristic width may be substantially larger than the second characteristic width.

In some examples, in the launch configuration, a first arrangement may mechanically couple a first one of the deployable module elements to one or both of the first spacecraft and a second one of the deployable module elements. In an on-orbit configuration, a second arrangement may mechanically couple the first one of the deployable module elements with the second spacecraft. In a transition configuration, intermediate to the launch configuration and the on-orbit configuration, each of the first arrangement and the second arrangement may be detached from the first one of the deployable module elements. In some examples, at least one of the first spacecraft and the second spacecraft may include a plurality of deployable module elements, in the launch configuration, the plurality of deployable module elements may be disposed in a launch vehicle in a stacked configuration such that a third arrangement mechanically couples adjacent ones of the plurality of module elements, and in the on-orbit configuration, the plurality of deployable module elements may be disposed in a side-by-side configuration such that a fourth arrangement mechanically couples adjacent module elements. In some examples, a lower portion of the payload stack may include a first plurality and a second plurality of deployable module elements, the first plurality being associated with the first spacecraft, the second plurality being associated with the second spacecraft, and an upper portion of the payload stack may include a third plurality and a fourth plurality of deployable module elements, the third plurality being associated with the first spacecraft, the fourth plurality being associated with the second spacecraft. In some examples, the lower portion of the payload stack may have a first characteristic width transverse to a longitudinal axis of the launch vehicle, the upper portion of the payload stack may have a second characteristic width transverse to the longitudinal axis of the launch vehicle, and the first characteristic width may be substantially larger than the second characteristic width. In some examples, the first plurality of the deployable module elements may be disposed in an aft region of the lower portion of the payload stack and the second plurality of the deployable module elements is disposed in a forward region of the lower portion of the payload stack. In some examples, at least one of the first plurality of the deployable module elements may be disposed forward of a first subset of the second plurality of deployable module elements and aft of a second subset of the second plurality of deployable module.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which:

FIGS. 4A-4C illustrate techniques by which a satellite is self-assembled into the on-orbit configuration, according to an implementation.

DETAILED DESCRIPTION

Figure 1:
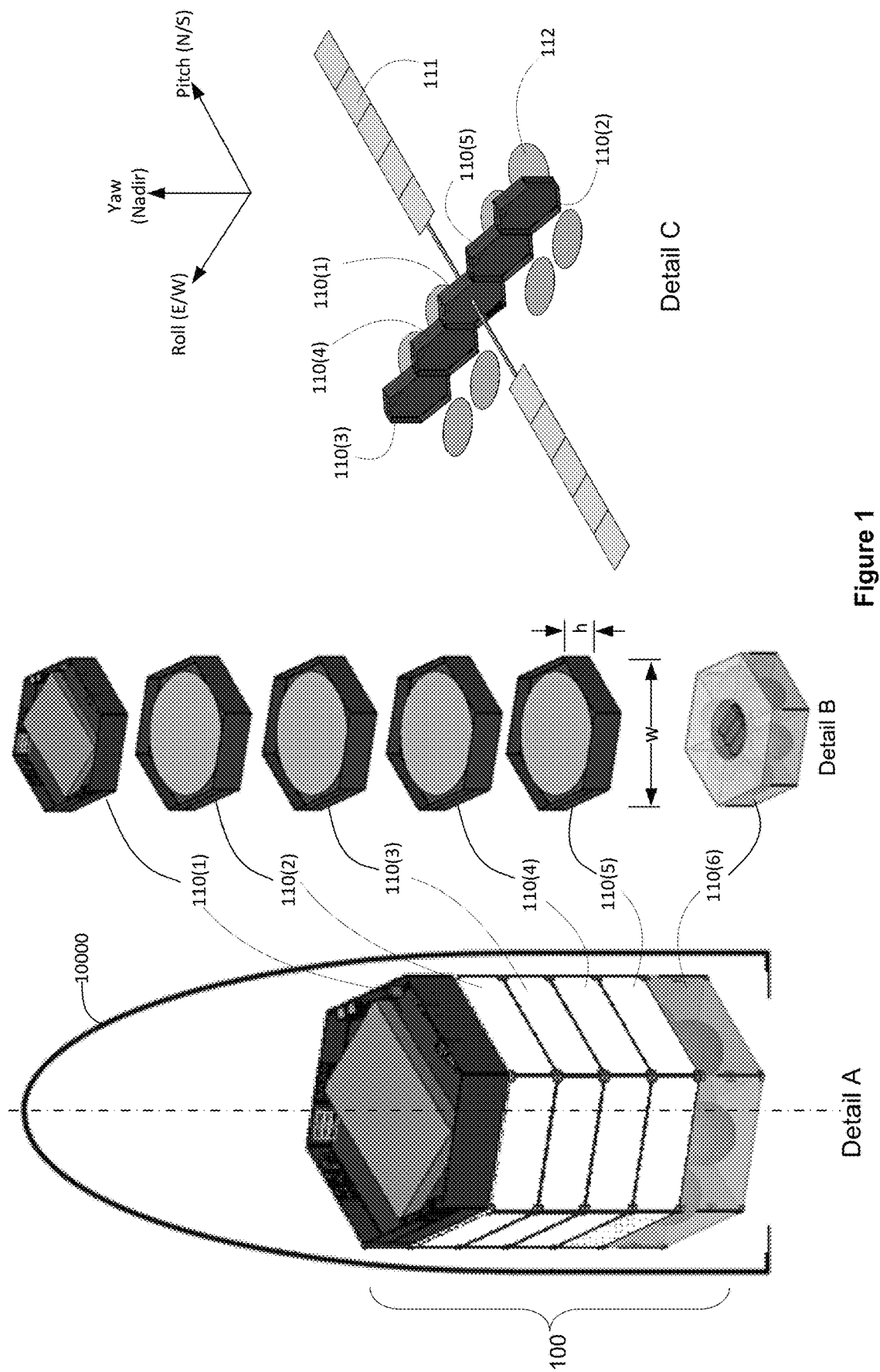
FIG. 1 illustrates an example of a spacecraft configured as a self-assembling persistent space platform, according to an implementation.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening feature s may be present. "Connected" or "coupled" may also be transient and/or releasable conditions. Two or more spacecraft may be "connected" or "coupled" when in the launch configuration aboard the LV and this condition may or may not continue following separation from the LV. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

Commercial spacecraft are configured with payload functionality and bus services functionality (i.e., "housekeeping" services such as provided by electrical power, telemetry and command, and attitude and orbit control subsystems, also referred to herein as infrastructure). In the absence of the presently disclosed techniques, the infrastructure and payload subsystems may be complexly intertwined as a self-contained, self-sustaining system. As a result, the payload service operator must finance the entire cost of the infrastructure and barriers to entry for satellite payload service providers are increased, particularly because the cost of the infrastructure must be paid prior to start of providing payload services.

The presently disclosed techniques improve the economics of deploying infrastructure to space. In some implementations, a spacecraft includes a plurality of deployable modules that are assembled in orbit. At least one of the deployable modules may be dedicated to housekeeping or "bus" services, such as power generation and storage, telemetry and command, and/or attitude and orbit control. At least one other of the deployable modules may be dedicated to payload functionality. The bus service deployable modules may be configured for longer term operation (15-20+ years), during which term one or more of the payload modules may be replaced.

FIG. 1 illustrates an example of a spacecraft configured as a self-assembling persistent space platform, according to an implementation. Referring to Detail A of FIG. 1, the spacecraft 100, illustrated in a launch configuration enclosed by a launch vehicle fairing, includes six deployable module elements 110. In the illustrated implementation, the deployable module element 110(1) may be configured as a bus service module, each of the deployable module elements 110(2), 110(3), 110(4) and 110(5) may be configured as a respective payload module, and the deployable module element 110(6) may be configured as a propulsion module.

As may be better observed in Detail B the deployable modules may be configured to have a similar form factor where a height 'h' is small relative to width 'w'. For example, in the illustrated implementation, 'h' may be approximately one meter and 'w' may be selected to maximize utilization of the launch vehicle fairing diameter, which may be approximately 4-5 meters. In the illustrated implementation, the deployable module elements have six edge faces, but a greater or smaller number of edge faces may be contemplated. In some implementations the deployable module elements may have a cross-section having a square, rectangular or circular form factor.

In the launch configuration, the deployable module elements may be disposed in a launch vehicle in a first arrangement. For example, in the configuration illustrated in Detail A, the first arrangement may be regarded as a "stacked arrangement". In the launch configuration, adjacent module elements may be mechanically coupled together. For example, module element 110(1) may be mechanically coupled with module 110(2); module element 110(2) may be mechanically coupled with module element 110(1) and with module element 110(3); module element 110(3) may be mechanically coupled with module element 110(2) and with module element 110(4); module element 110(4) may be mechanically coupled with module element 110(3) and with module element 110(5); module element 110(5) may be mechanically coupled with module element 110(4) and with module element 110(6); and module element 110(6) may be mechanically coupled with module element 110(5). Advantageously, the mechanical couplings may be releasable such that adjacent deployable modules may be separated from one another after launch. For example, the mechanical couplings may be or include releasable holddowns or by an exoskeleton (not illustrated), as described, for example in U.S. patent application Ser. No. 15/669,470, entitled "MULTI-REFLECTOR HOLD-DOWN" and in U.S. patent application Ser. No. 15/480,276, entitled "EXOSKELETAL LAUNCH SUPPORT STRUCTURE", the disclosures of which are hereby incorporated by reference into the present application in their entireties.

As will be described in more detail hereinbelow, at least one of the deployable modules may include a robotic manipulator (not illustrated) operable to reconfigure (or "self-assemble") the spacecraft from the launch configuration to an on-orbit configuration. Detail C illustrates the spacecraft in an on-orbit configuration according to an implementation. It may be observed that, in the on-orbit configuration, the deployable modules are disposed in a second arrangement that may be regarded as a "side-by-side arrangement". In the on-orbit configuration, adjacent module elements may be mechanically coupled together. For example, module element 110(2) may be mechanically coupled with module 110(3); module element 110(3) may be mechanically coupled with module element 110(2) and with module element 110(1); module element 110(1) may be mechanically coupled with module element 110(3) and with module element 110(4); module element 110(4) may be mechanically coupled with module element 110(1) and with module element 110(5); module element 110(5) may be mechanically coupled with module element 110(4). Advantageously, the mechanical couplings may be releasable such that adjacent deployable modules may be separated from one another in order to replace a defective module element or to otherwise reconfigure the spacecraft on-orbit.

It should be noted that the relative positions of the module elements as disposed in the on-orbit configuration is not necessarily the same as in the launch configuration. For example, in the illustrated implementation, module element 110(1), which may be a bus service module that includes a solar array 111, is disposed, in the launch configuration, at the top of the stack, adjacent only to module element 110(2). In the illustrated on-orbit configuration, the module 110(1) is centrally disposed, and is adjacent to two payload module elements, module element 110(4) and module element 110(5). Moreover, although for simplicity of illustration, the on-orbit configuration depicted in Detail C depicts a single linear row of module elements, the disclosed techniques contemplate more complex arrangements including multiple rows, and non-linear arrangements, for example.

In the illustrated implementation, each of module elements 110(2), 110(3), 110(4) and 110(5) is a payload module element that includes two antenna reflectors 112. It will be appreciated that a payload element may be configured without an antenna reflector or with a number of reflectors different than two.

Figure 2:
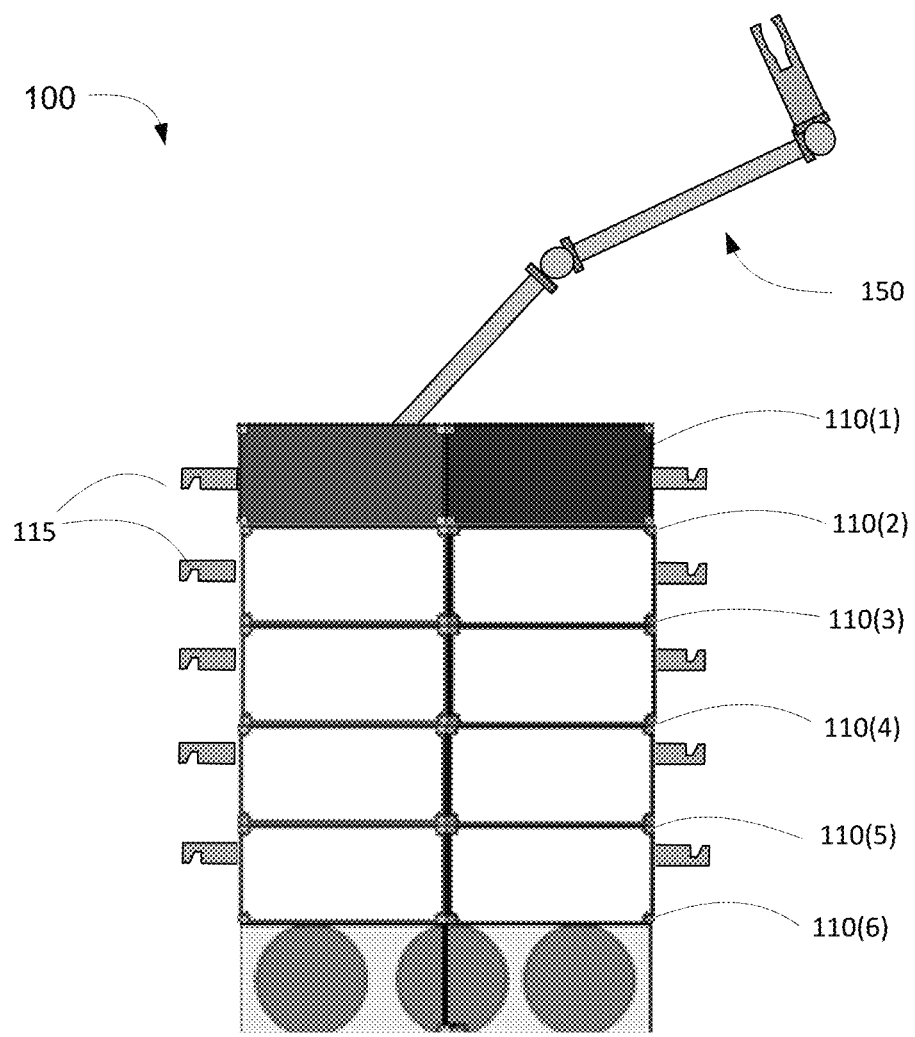
FIG. 2 illustrates a view of the spacecraft following separation from a launch vehicle, according to an implementation.

FIG. 2 illustrates a view of the spacecraft 100 following separation from a launch vehicle. In the illustrated implementation, at least one deployable module element 110 includes a robotic manipulator 150, and each deployable module element 110 includes at least one grappling fixture 115. Some or all of the grappling fixtures 115 may provide an electrical power and/or telemetry/command interface between the manipulator 450 and module elements 110, in addition to a mechanical coupling between the module elements 110 and the manipulator 450. The mechanical coupling, advantageously, may be engaged, disengaged, and reengaged any number of times.

Figure 3:
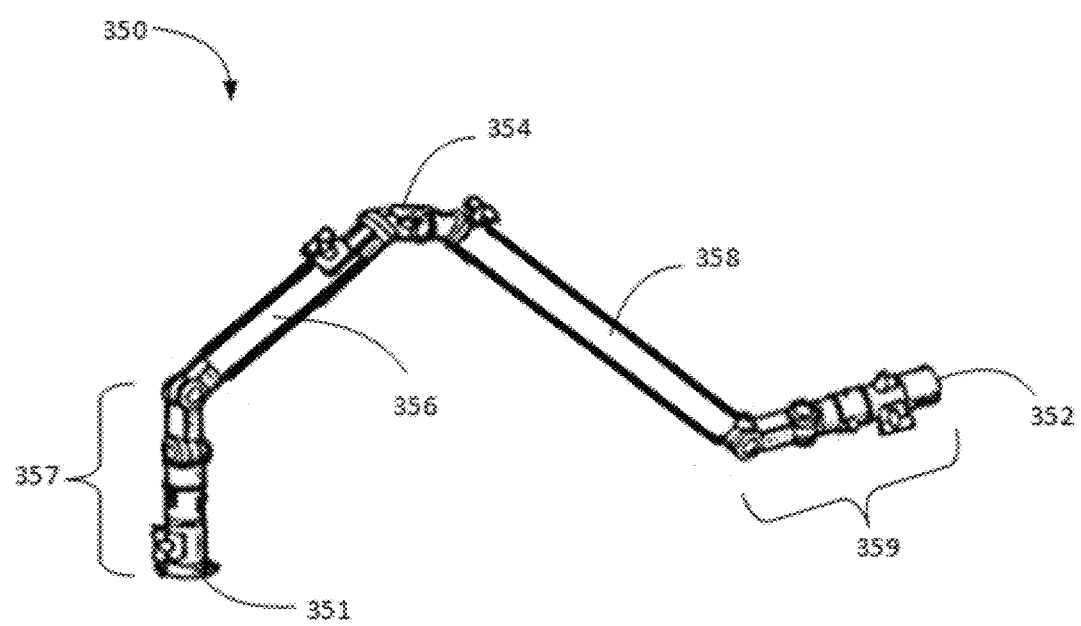
FIG. 3 illustrates an example a robotic manipulator will be described, according to an implementation.

In some implementations, the robotic manipulator may include a robotic arm having two end effectors and several articulable joints disposed therebetween. For example, referring now to FIG. 3, an example of a robotic manipulator will be described. Manipulator 350 includes first and second longitudinally elongated arms 356 and 358. Respective proximal ends of the arms 356 and 358 may be coupled together by means of an elbow joint 354. Articulator 357 including one or more articulable joints may be coupled with a distal end of arm 356. Similarly, articulator 359 may be coupled with a distal end of arm 358. In some implementations one or both of the articulator 357 and the articulator 359 includes a pitch joint, a yaw joint, and a roll joint. First and second end effectors 351 and 352 may be mounted at the respective distal ends of the articulators 357 and 359.

Figure 4A:
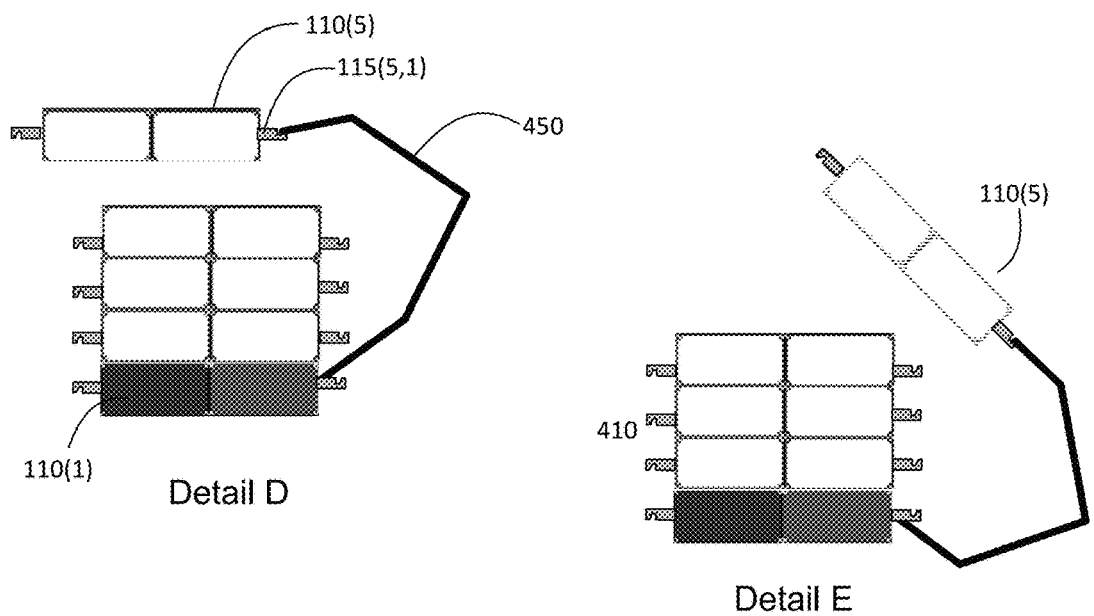
Figure 4A:
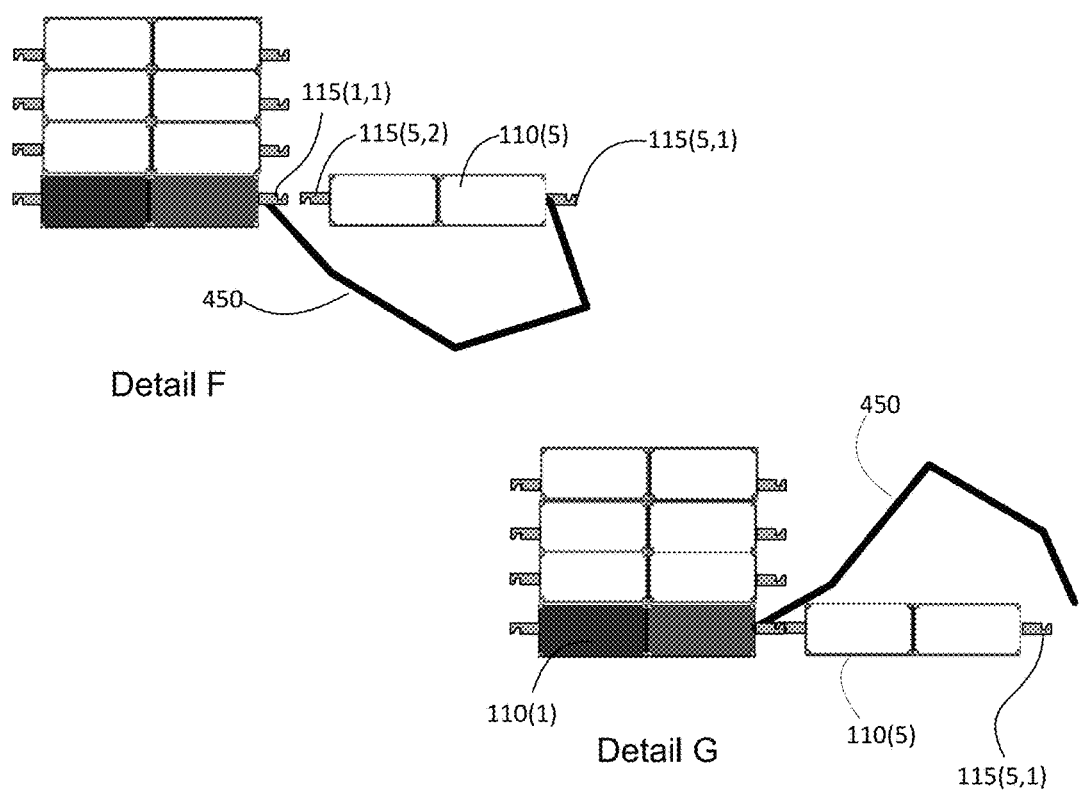
Figure 4B:
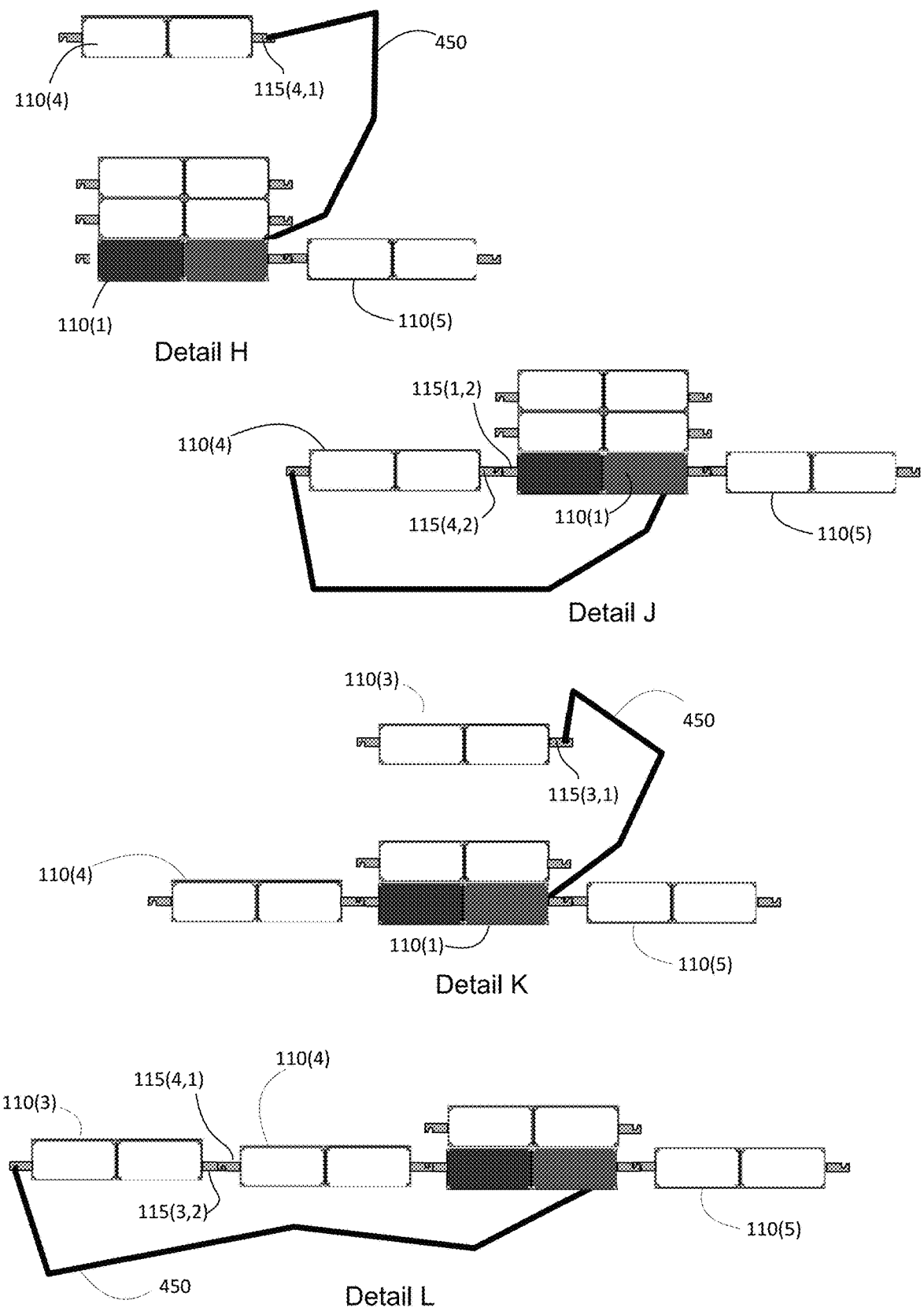

FIGS. 4A-4C illustrate techniques by which the satellite 100 is "self-assembled" into the on-orbit configuration. In the illustrated implementation, a manipulator 450 is used to move the plurality of deployable module elements 110 from the stacked launch configuration to the side-by-side on-orbit configuration. Referring first to Detail D of FIG. 4A, a configuration is illustrated that may occur as part of a transition between the launch configuration the on-orbit configuration. In the illustrated "transition configuration" of Detail D, the module element 110(5) has been decoupled and moved away from the remainder of the stacked module elements by the manipulator 450. The manipulator 450 may include a proximal portion having a first end effector that has a mechanical coupling with one of the remainder of the stacked module elements. In some implementations, the mechanical coupling is by way of a grappling fixture 115. In the illustrated configuration, the manipulator 450 is mechanically coupled at the first end with bus services module 110(1). A distal portion of the manipulator 450 may include a second end effector that is detachably engaged with the deployable module element 110(5) by way of grappling fixture 115(5,1).

In a second transition configuration illustrated in Detail E, the deployable module element 110(5) is depicted as having been translated and rotated, by the manipulator 450, with respect to the stack of remaining module elements toward a position consistent with a desired on-orbit configuration (Detail F).

Referring now to Detail F, it is illustrated that the manipulator 450 has positioned the deployable module element 110(5) proximate to a desired on-orbit location. More particularly, in the illustrated configuration, the deployable module element 110(5) has been positioned proximate to the bus services module element 110(1) such that it may be attached by way of grappling fixtures 115(1,1) and 115(5,1) as shown in Detail G. For simplicity of illustration, a mechanical coupling between the deployable module elements is depicted as being by way of grappling fixtures 115(1,1) and 115(5,1). In some implementations, however, a mechanical coupling arrangement may be provided between adjacent deployable modules in the on-orbit configuration that is different than the grappling fixtures 115. In some implementations, an electrical power and/or telemetry/command interface between the adjacent deployable modules is established at or about the time that a mechanical coupling is established. In some implementations, the manipulator 450 may be configured to attach the deployable module element 110(5) to the deployable module element 110(1). Subsequently, the second end effector of the manipulator 450 may be detached and separated from the grappling fixture 110(5,1) of the deployable module element 110(5) (Detail G).

Referring next to Detail H of FIG. 4B, a second deployable module element 110(4) is illustrated as having been uncoupled and moved away from the remainder of the module elements by the manipulator 450. Referring now to Detail J, it is illustrated that the manipulator 450 has positioned the deployable module element 110 (4) proximate to the deployable module element 110(1) such that the deployable module element 110(4) and the deployable module element 110 (1) may be coupled together. More particularly, in the illustrated configuration, the deployable payload module element 110(4) has been positioned proximate to the bus services module element 110(1) such that it may be attached by way of grappling fixtures 115(1,2) and 115(4,2) as shown in Detail J.

Referring next to Detail K of FIG. 4B, a third deployable module element 110(3) is illustrated as having been uncoupled and moved away from the remainder of the module elements by the manipulator 450. Referring now to Detail L, it is illustrated that the manipulator 450 has positioned the deployable module element 110(3) proximate to the deployable module element 110(4) such that the deployable module element 110(3) and the deployable module element 110 (4) may be coupled together. More particularly, in the illustrated configuration, the deployable payload module element 110(3) has been positioned proximate to the deployable payload module element 110(4) such that it may be attached by way of grappling fixtures 115(3,2) and 115(4,1) as shown in Detail L.

Referring next to Detail M of FIG. 4C, a fourth deployable module element 110(2) is illustrated as having been uncoupled and moved away from the remainder of the module elements by the manipulator 450. Referring now to Detail N, it is illustrated that the manipulator 450 has positioned the deployable module element 110(2) proximate to the deployable module element 110(5) such that the deployable module element 110(2) and the deployable module element 110 (5) may be coupled together. More particularly, in the illustrated configuration, the deployable payload module element 110(2) has been positioned proximate to the deployable payload module element 110(5) such that it may be attached by way of grappling fixtures 115(2,2) and 115(5,1) as shown in Detail N.

For clarity of illustration, in FIGS. 4A through 4C, solar arrays and antenna reflectors that may be coupled with the various module elements 110 are omitted. It will be appreciated however that one or more solar arrays at one or more antenna reflectors may be deployed at any stage of the self-assembly process illustrated in FIGS. 4A through 4C.

Advantageously, the bus services module element 110(1) may be configured to interchangeably couple with various types of payload module elements. Moreover, in some implementations, the bus services module element 110(1) may be configured to provide a service life that is relatively long (15-20+ years) compared to the anticipated service life of the payload module elements. During the course of life of the bus services module element 110(1), it is contemplated that payload module elements deployed with or early in the life of the bus services module element 110(1) ("original payload module elements") may become unreliable or obsolete. It is contemplated that such payload module elements may be "swapped out" with replacement payload module elements that are delivered to orbit subsequent to the initial launch of the s bus services module element 110(1). Advantageously, the replacement payload module elements may have an interchangeable mechanical and electrical interface as the original payload module element. In some implementations, the manipulator 450 may be used to decouple and separate a payload module element (that has become, for example, obsolete) and attach a replacement payload module. Consequently, it is contemplated that a persistent platform may be provided by a long-lived bus services module element 110(1).

In some implementations the propulsion module 110(6) may be configured as a separable stage including one or more chemical or electric thrusters. Chemical thrusters, whether the propellant is solid or liquid, monopropellant or bipropellant, deliver thrust by converting chemical energy stored in the propellant to kinetic energy delivered to combustion products of the chemical propellant. Chemical thrusters, as the term is used herein, and in the claims, also include electrothermal thrusters such as arc-jets that are configured to use electrical energy to increase the temperature, and, therefore, the velocity of the combustion products of chemical propellants.

In contrast, an electric thruster, as the term is used herein, and in the claims, converts electrical energy to propellant kinetic energy substantially without regard to any chemical energy the propellant may possess. For example, an electric thruster may operate by ionizing and accelerating a gaseous propellant, where the propellant is a heavy noble gas such as xenon or argon. Irrespective of the selected propellant, a negligible amount of thrust results from energy chemically stored in the propellant. The term electric thruster, as used herein and in the claims, encompasses an electrostatic thruster, an electromagnetic thruster, a Hall Effect thruster, a wakefield accelerator, and a traveling wave accelerator, for example.

The propulsion module 110(6) may execute an orbit transfer strategy that transfers the satellite from a launch vehicle deployment orbit to an orbit (a "graveyard orbit") that is higher than GEO by a sufficient amount to provide a safe disposal of the propulsion module 110(6). The propulsion module 110(6) may be separated from the remainder of the spacecraft 100 in the graveyard orbit. Subsequently, the spacecraft 100 may be moved to GEO using, advantageously, electric thrusters disposed on one or more of the remaining deployable modules 110.

FIGS. 5A-5D illustrate techniques by which a satellite is "self-assembled" into the on-orbit configuration, in accordance with another implementation. In the illustrated implementation, a manipulator 550 is used to move a plurality of deployable module elements 510 from a stacked launch configuration to a side-by-side on-orbit configuration. Referring first to Detail P of FIG. 5A, a configuration is illustrated that may occur as part of a transition between the launch configuration the on-orbit configuration. In the illustrated "transition configuration" of Detail P, similar to Detail J of FIG. 4B, a bus services module element 510(1) is depicted as being disposed between and side by side with deployable module elements 510(4) and 510(5). Two additional deployable module elements 510(2) and 510(3) are depicted as being disposed, stacked, above the bus services module element 510(1). The bus services module element 510(1) is attached to deployable module elements 510(4) and 510(5) by way of, respectively, grappling fixtures 515(1,2) and 515(1,1). A grappling fixture 515(1,3) is depicted as being coupled with a first end 550a of the manipulator 550. Each of the first end 550a and a second end 550b of the manipulator 550 may include an end effector configured to detachably couple with a respective grappling fixture. In some implementations, the mechanical coupling is by way of a grappling. In the configuration illustrated in Detail P, the manipulator 550 is detachably engaged with the first end 550a with bus services module 110(1) by way of the grappling fixture 515(1,3), whereas the second end 550b of the manipulator 550 is detachably engaged with the deployable module element 510(4) by way of a grappling fixture 515(4,3).

Referring now to Detail Q, the manipulator 550 is illustrated as having been reconfigured so that the first end 550a has been detached from the grappling fixture 515(1,3) of bus services module element 510(1), and relocated so as to detachably engage with the module element 510(3) by way of a grappling fixture 515(3,3). It may also be observed that the module element 510(3) has been separated from the remaining module elements in the stack.

Figure 5A:
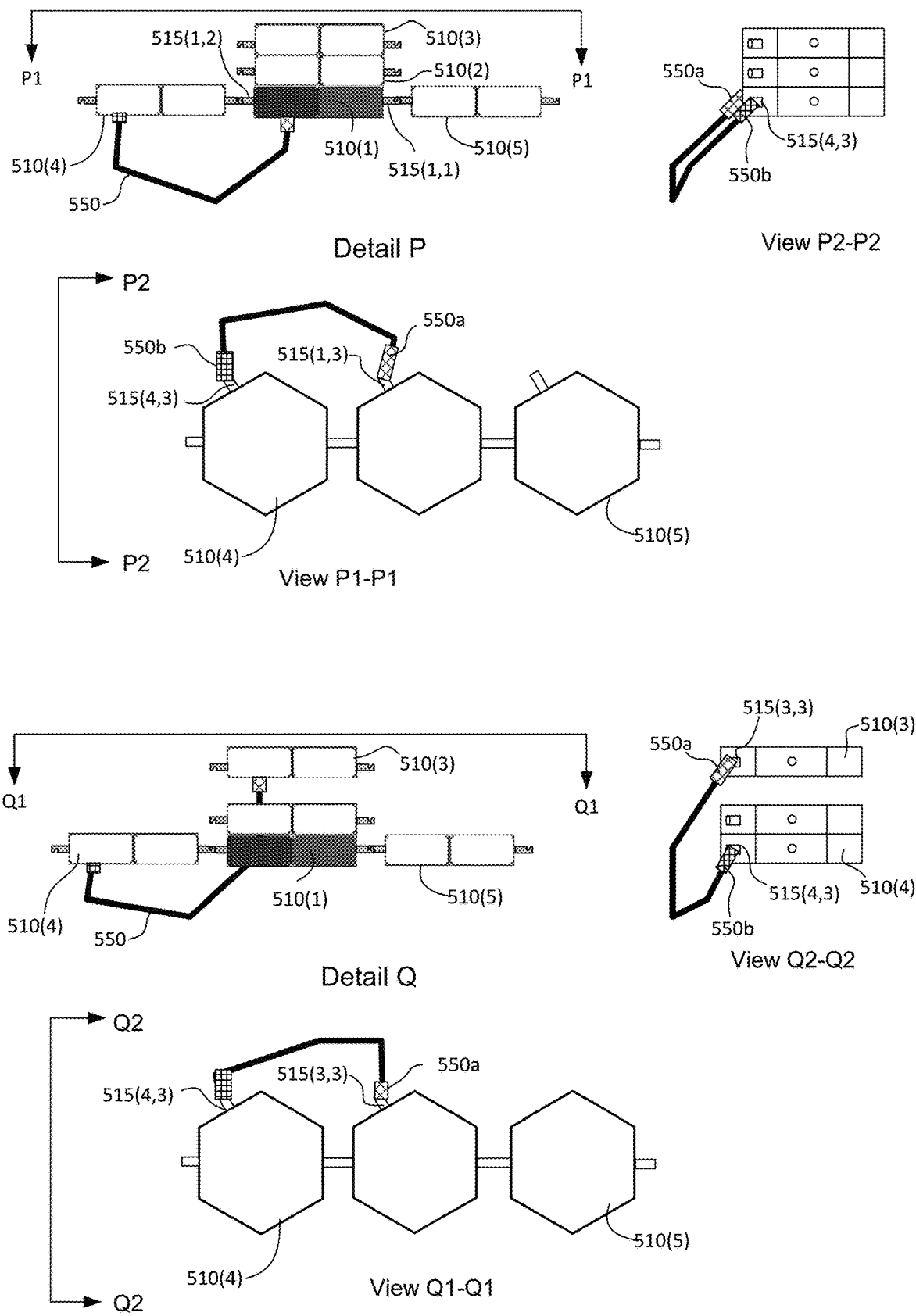
FIGS. 5A-5D illustrate techniques by which a satellite is self-assembled into an on-orbit configuration, in accordance with another implementation.
Figure 5B:
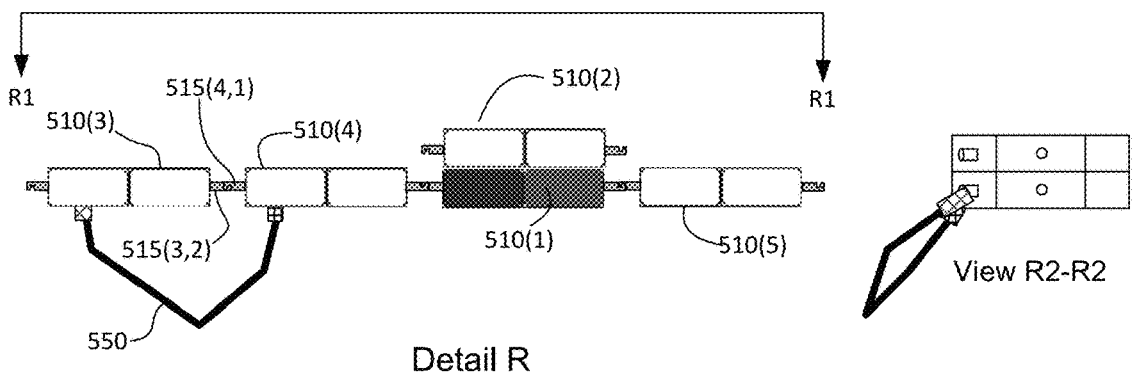
Figure 5B:
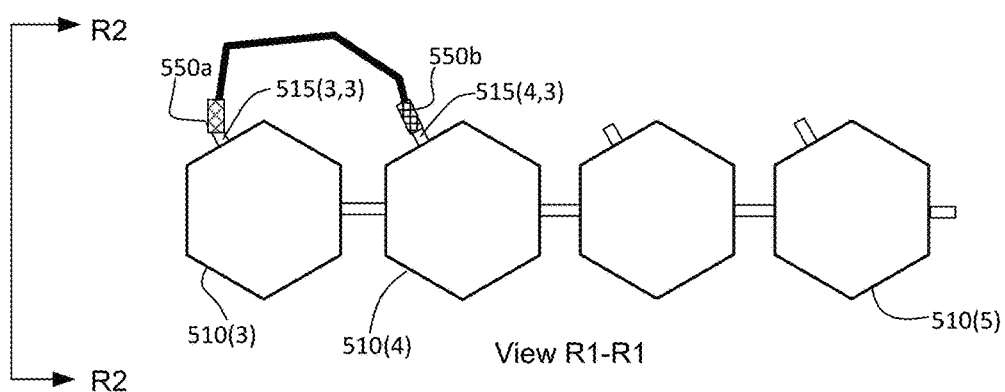
Figure 5B:
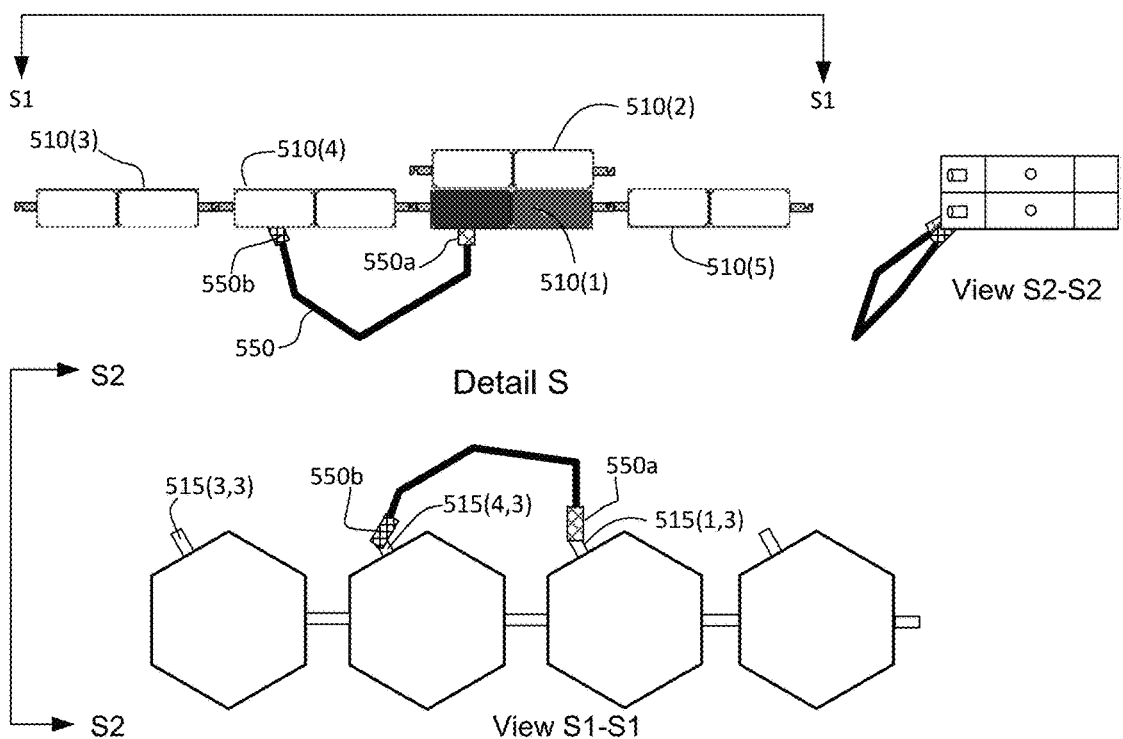

Referring now to Detail R of FIG. 5B, it is illustrated that the manipulator 550 has positioned the deployable module element 510(3) proximate to the deployable module element 510(4) such that the deployable module element 510(3) and the deployable module element 510 (4) may be coupled together. More particularly, in the illustrated configuration, the deployable payload module element 510(3) has been positioned proximate to the deployable payload module element 510(4) such that it may be attached by way of grappling fixtures 515(3,2) and 515(4,1) as shown in Detail R.

Referring now to Detail S, the manipulator 550 is illustrated as having been reconfigured such that the first end 550a has been detached from the grappling fixture 515(3,3) of bus services module element 510(3) and relocated so as to detachably engage with the module element 510(1) by way of a grappling fixture 515(1,3).

Figure 5C:
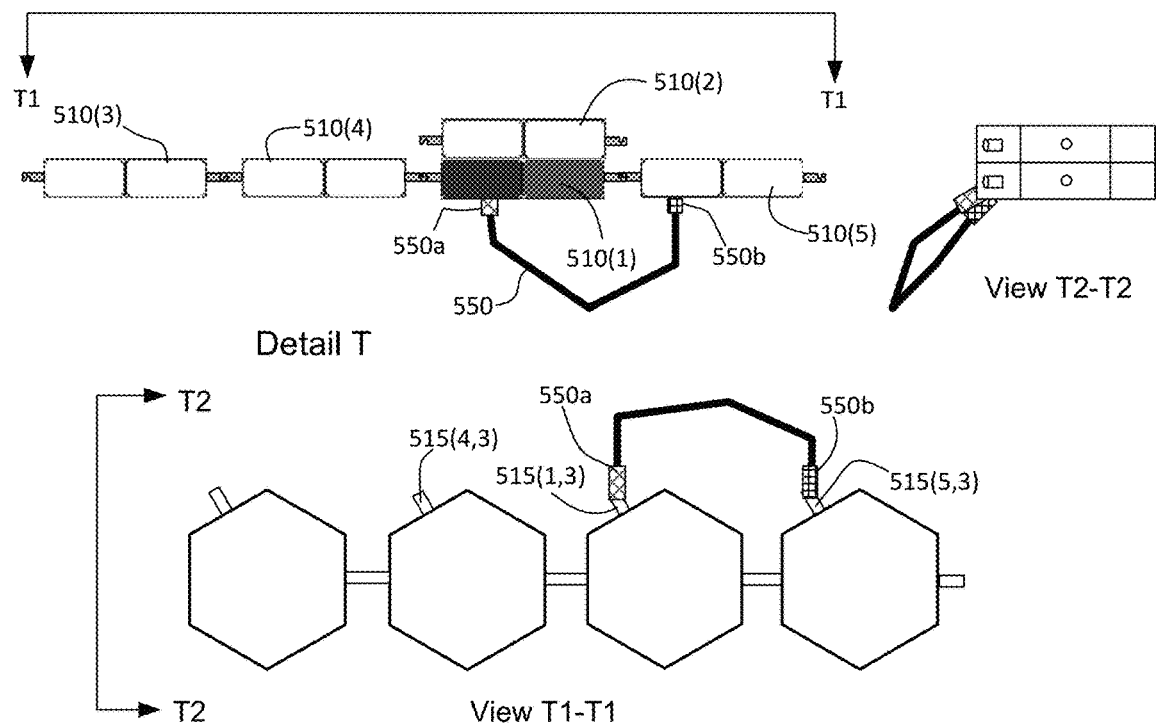
Figure 5C:
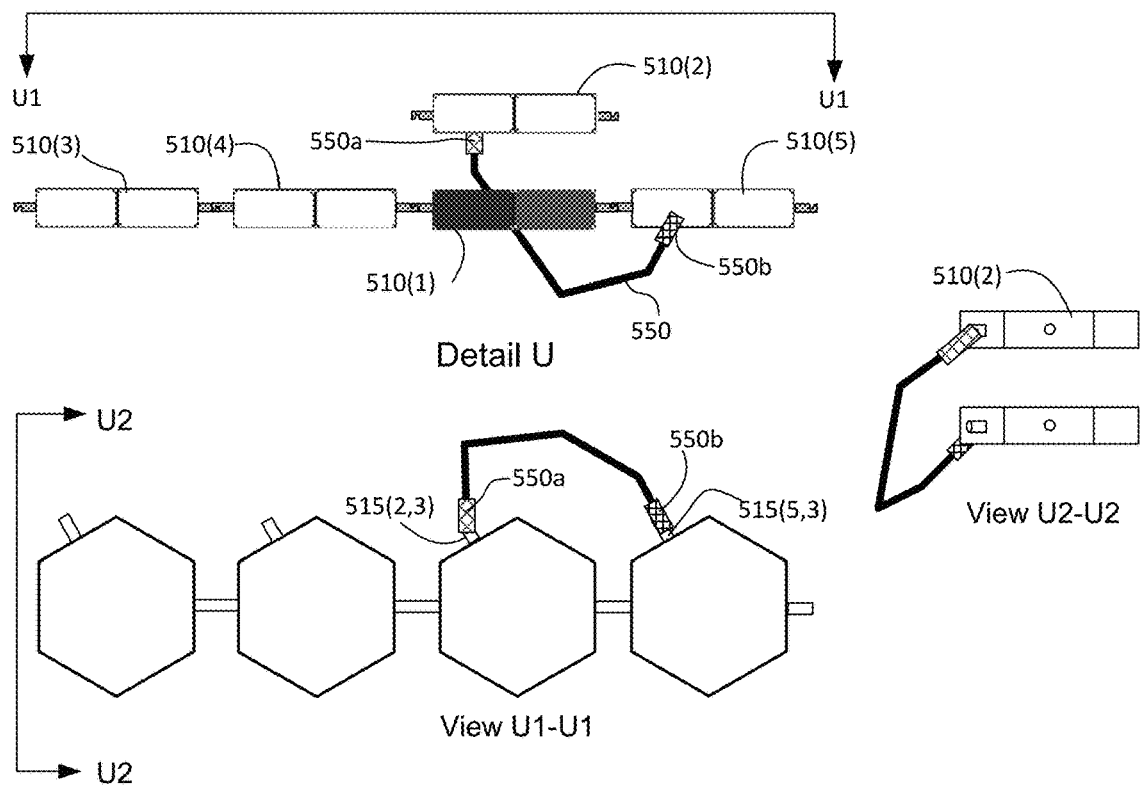
Figure 5D:
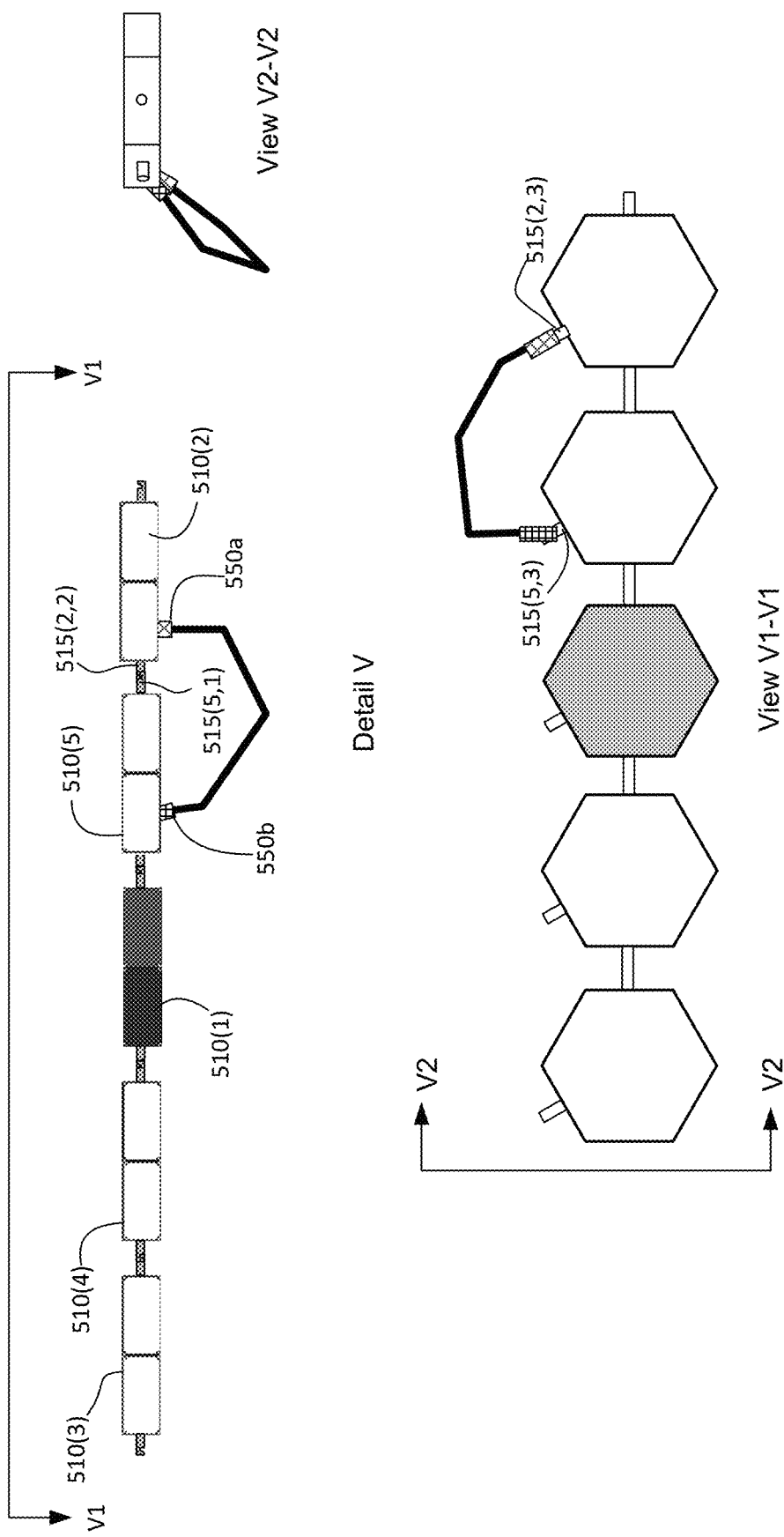

Referring next to Detail T of FIG. 5C, the manipulator 550 is illustrated as having been reconfigured such that the second end 550b has been detached from the grappling fixture 515(4,3) of bus services module element 510(4) and relocated so as to detachably engage with the module element 510(5) by way of a grappling fixture 515(5,3).

Referring now to Detail U, the manipulator 550 is illustrated as having been reconfigured so that the first end 550a has been detached from the grappling fixture 515(1,3) of bus services module element 510(1), and relocated so as to detachably engage with the module element 510(2) by way of a grappling fixture 515(2,3). It may also be observed that the module element 510(2) has been separated from the bus services module element 510(1).

Referring now to Detail V of FIG. 5C, it is illustrated that the manipulator 550 has positioned the deployable module element 510(3) proximate to the deployable module element 510(5) such that the deployable module element 510(2) and the deployable module element 510(5) may be coupled together. More particularly, in the illustrated configuration, the deployable payload module element 510(2) has been positioned proximate to the deployable payload module element 510(5) such that it may be attached by way of grappling fixtures 515(3,2) and 515(4,1) as shown in Detail V.

In the implementation illustrated in FIGS. 5A-5C, five deployable modules are illustrated. It should be appreciated that, because manipulator 550 is configured as self-relocatable manipulator, a substantially larger number of modules may be contemplated without a necessity to increase the size and mass of the manipulator 550.

Figure 6:
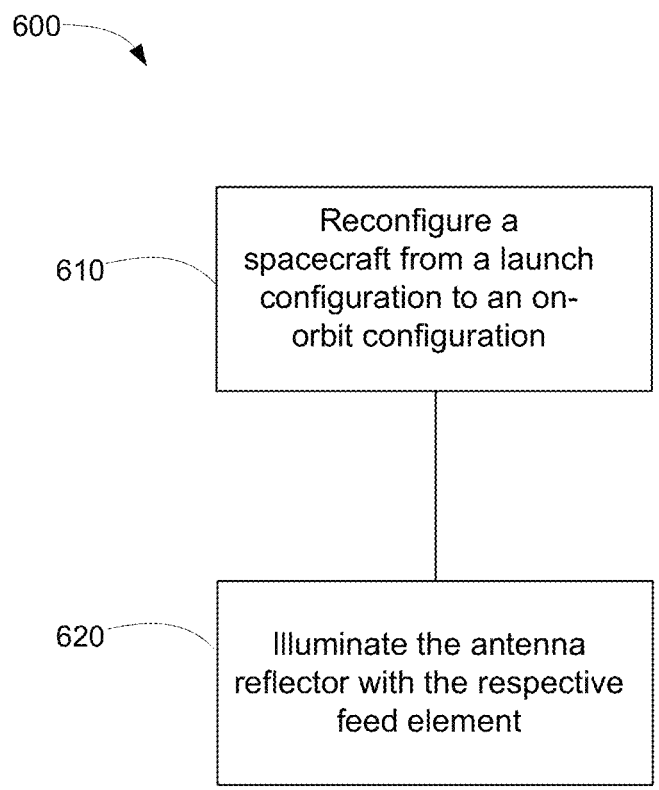
FIG. 6 illustrates a process flow diagram for configuring a spacecraft for on-orbit operation.

FIG. 6 illustrates a process flow diagram for configuring a spacecraft for on-orbit operation. As described hereinabove the spacecraft may include, in a launch configuration, a plurality of deployable module elements disposed in a launch vehicle in a stacked arrangement, the deployable module elements being disposed, in an on-orbit configuration, in a side-by-side arrangement. At least one of the deployable module elements may include a robotic manipulator operable to reconfigure the spacecraft from the launch configuration, through a transition configuration, to the on-orbit configuration. The method 600 may start, at block 610 with reconfiguring an orbiting spacecraft from a launch configuration to an on-orbit configuration. The method 600 may finish, at block 620, with operating the orbiting spacecraft in the on-orbit configuration. The reconfiguring step may be accomplished using a robotic manipulator, for example, a self-relocatable robotic arm.

In some implementations, the capital expense required of payload service providers may be substantially reduced by providing, under a contractual arrangement, housekeeping services by way of a persistent space-based infrastructure module. The arrangement may be referred to as a "condominium" spacecraft infrastructure, in view of the fact that at least some of the bus services may be shared by payload modules owned and/or operated by separate parties who may be otherwise unrelated. It is contemplated that the infrastructure module may be detachably coupled with one or more of the payload modules and that a payload module may be replaced or interchanged from time to time during the operational life of the infrastructure module. The bus services may include, for example, electrical power, telemetry and command interfaces with a ground station, attitude control and orbit control. Advantageously, the bus services module may be designed to provide substantially more service capacity than would be required by any single payload module, and to have a substantially longer operational life than at least some payload modules.

The bus services may be provided under a contract between a first party which is the owner/operator of the infrastructure module and a second party which is an owner/operator of at least one of payload services modules. The contract may be in the form of a lease, in some implementations; however, other contractual schemes may be contemplated. For example two or more owner/operators of payload services modules may form a joint venture or similar business entity that finances and owns/operates the infrastructure module and rents or leases bus services to the two or more owner/operators of payload services modules and/or to other owner/operators of payload services modules.

In some implementations, the infrastructure module may be deployed into space at a substantially earlier time than at least one of the one or more payload modules. Thus, the disclosed techniques are compatible with non-simultaneous (asynchronous) launch of independent modules that are then assembled on-orbit. Alternatively, or in addition, the infrastructure module may be configured to be expanded and/or refurbished to accommodate, over its mission lifetime, possible changes in requirements for bus services. The infrastructure functions may be physically contained in one or more infrastructure module(s) that may be separate from and detachably coupled with the mission payload modules, at least some of which may be owned/operated by a different entity than that which owns/operates the infrastructure modules. As a result, no dedicated or permanent connection (physical or economic) necessarily exists between respective diverse owner/operators of the payload modules and the infrastructure module(s).

In some implementations, a satellite services "space real estate" business model may be implemented in which bus services may be "for rent or lease" by a number of diverse mission payloads. For example, a commercial business entity may deploy an infrastructure module and lease services to mission payload owners. In some implementations, the commercial business entity may also own/operate one or more payload modules. Whether or not this is so, the mission payload owners receiving leased services may benefit from a substantial reduction in initial capital expense. Moreover, the disclosed techniques allow mission payloads to be replaced so that a single mission payload need not carry the full cost burden of the infrastructure for the entire service life of the infrastructure elements. This further reduces the cost burden, particularly where the expected service life of a payload module is less than that of the infrastructure module.

Figure 7:
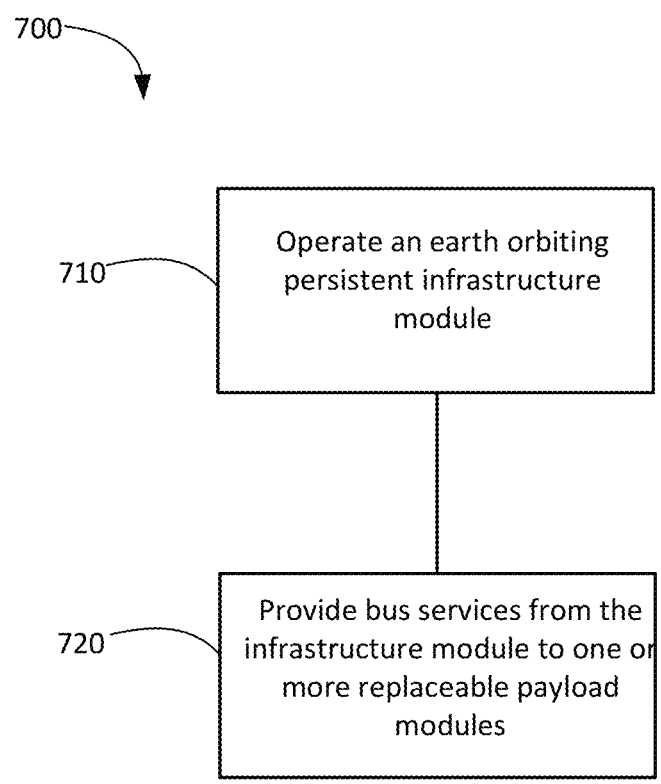
FIG. 7 illustrates a process flow diagram for providing bus services to one or more replaceable payload modules, according to an implementation.

FIG. 7 illustrates a process flow diagram for providing bus services to one or more replaceable payload modules, according to an implementation. The method 700 may start, at block 710, with operating an earth orbiting persistent infrastructure module. As described above, the infrastructure module may be configured to provide housekeeping subsystems, such as electrical power, telemetry and command, and attitude and orbit control subsystems. The infrastructure module may be detachably coupled with the replaceable payload modules. The method 700 may finish, at block 720, with providing bus services from the infrastructure module to the replaceable payload modules. The bus services may be provided under a contract between a first owner/operator of the infrastructure module and a second owner/operator of at least one of the one or more payload services modules.

Figure 8:
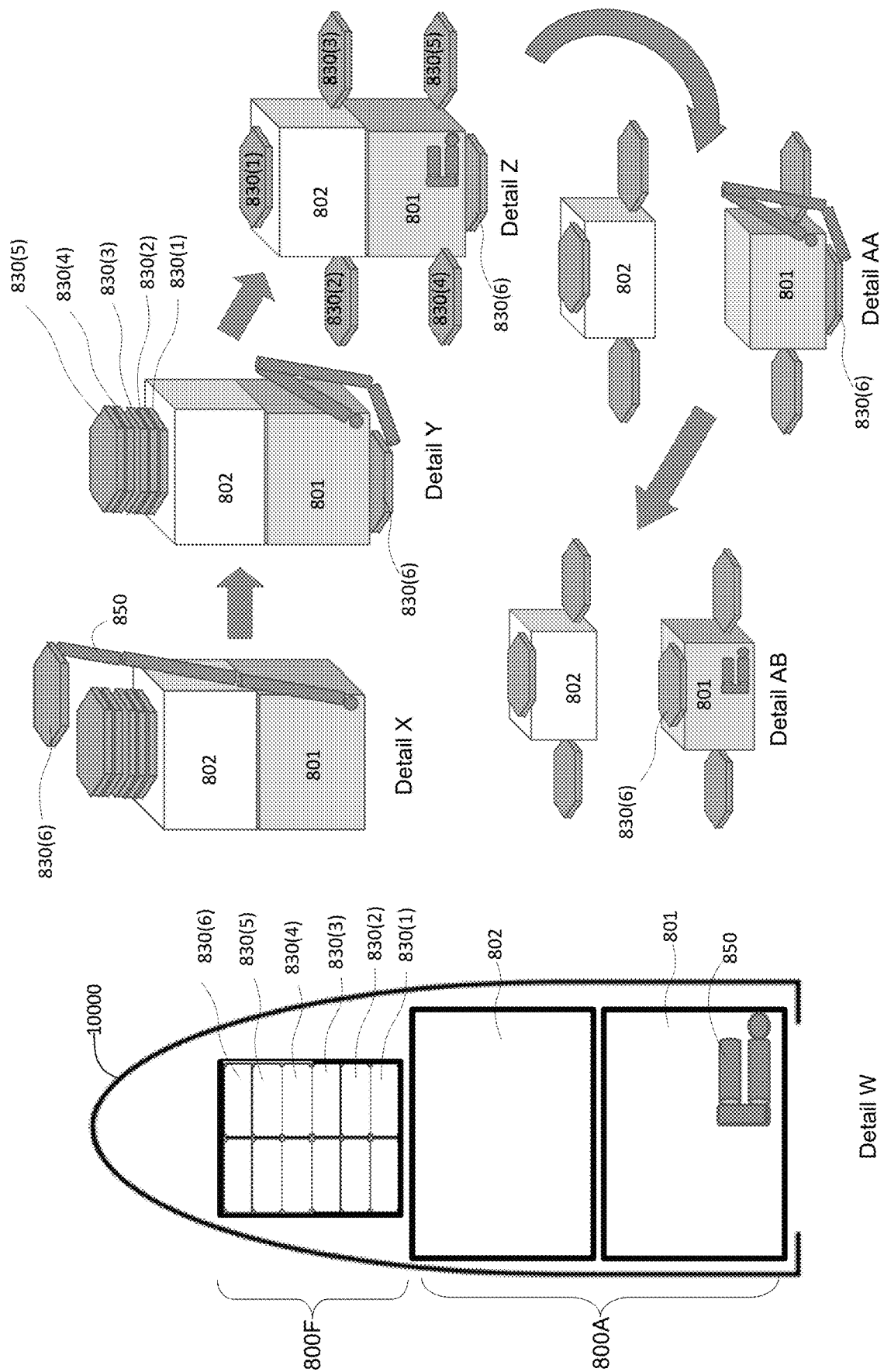
FIG. 8 illustrates a launch vehicle payload including a robotic manipulator and a payload stack, in accordance with an implementation involving launch of two spacecraft on a single launch vehicle.

FIG. 8 illustrates a launch vehicle payload including a robotic manipulator and a payload stack, in accordance with an implementation. In the implementation illustrated in Detail W, in the launch configuration a payload stack includes a lower (or aft) portion 800A of the stack that includes a first spacecraft 801 and a second spacecraft 802. In the illustrated launch configuration, the second spacecraft 802 is disposed forward of the first spacecraft 801. The payload stack also includes an upper (or forward) portion 800F that includes a number of deployable module elements 830. Similarly to implementations described above in connection with FIGS. 1-6, deployable module elements 830 may, following launch, be relocated from the stacked launch configuration of Detail W to an on-orbit arrangement (Detail AB) in which at least one deployable module 830 is coupled with the first spacecraft 801.

Referring now to Detail X through Detail AB, an example reconfiguration sequence is illustrated, during which a robotic manipulator 850 may relocate the deployable module elements 830. Detail X shows that the modules 830 may be individually removed from the stack and manipulated one at a time. Detail Y shows that the first deployable module removed, 830(6) may be disposed in a temporary stow location. In the illustrated example, deployable module 830(6) is temporarily disposed near an aft surface of the first spacecraft 801. Detail Z shows an in interim arrangement in which deployable modules 830(1), 830(2) and 830(3) are disposed in an on-orbit configuration coupled with the second spacecraft 802 and in which deployable modules 830(4) and 830(5) are disposed in an on-orbit configuration coupled with the first spacecraft 801. Detail AA illustrates a configuration in which the first spacecraft 801 has been separated from the second spacecraft 802. As a result of the separation, a forward surface of first spacecraft 801, previously proximate to an aft surface of spacecraft 802 becomes accessible. Detail AB an on-orbit configuration that may result from the mechanical arm repositioning module 830(6) from the aft surface of spacecraft 801 to the forward surface of spacecraft 801.

Advantageously, the deployable module elements 830 may be characteristically smaller in size than the spacecraft 801 and 802, particularly in a dimension transverse to a longitudinal axis of the fairing 10000. As a result, a total "stack height" of the launch vehicle payload may be increased, because the deployable module elements 830 fit within a tapered forward section of the launch vehicle fairing that is not large enough to accommodate the spacecraft 801 or the spacecraft 802.

Figure 9:
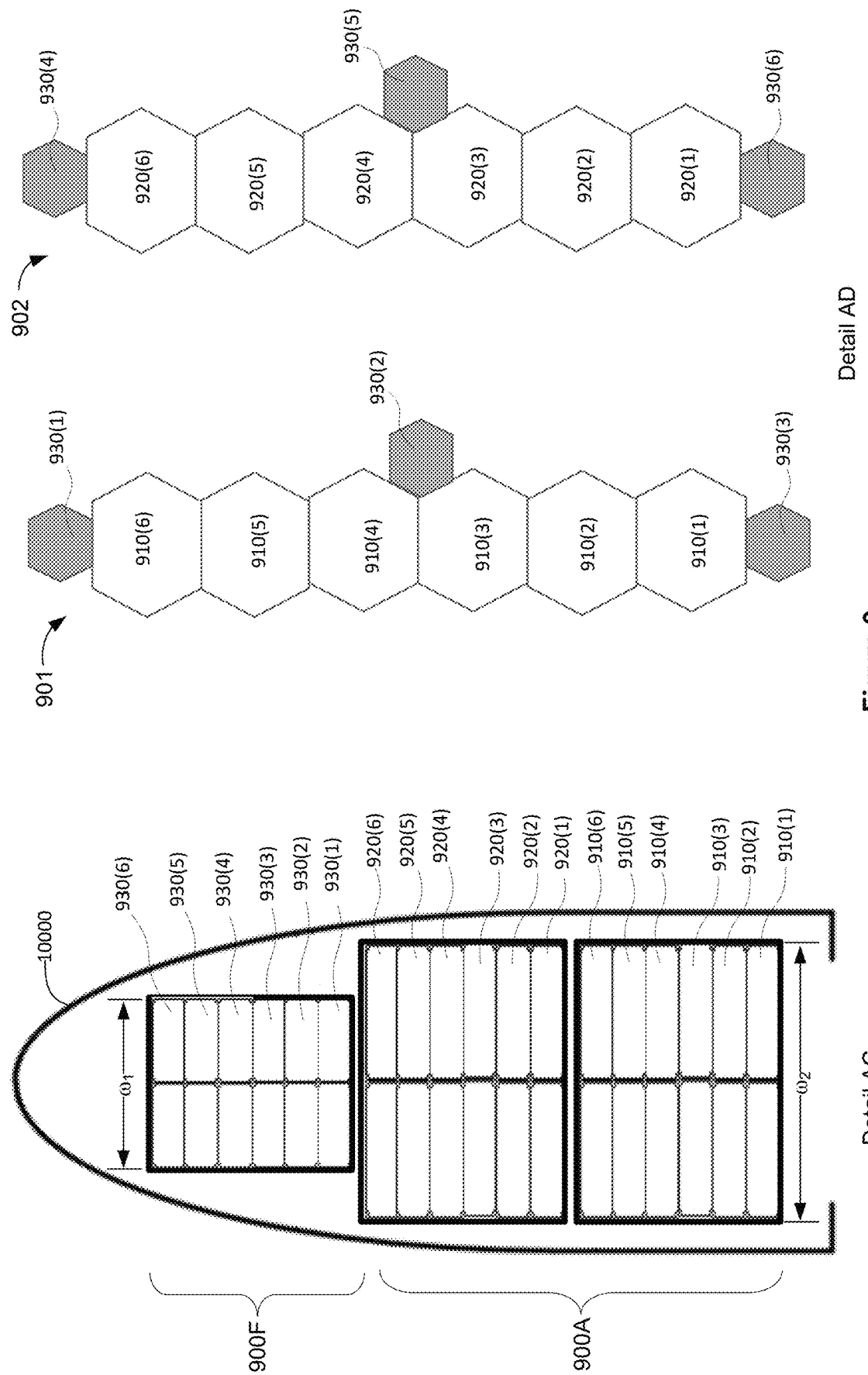
FIG. 9 illustrates a launch vehicle payload, in accordance with another implementation.

FIG. 9 illustrates a launch vehicle payload, in accordance with another implementation. In the implementation illustrated in Detail AC, a lower (or aft) portion 900A of the stack includes a first plurality of deployable module elements 910 associated with a first spacecraft 901 and a second plurality of deployable module elements 920 associated with a spacecraft 902. The deployable modules 910 and 920 are stacked, in a launch configuration, together with a third plurality of deployable modules 930 for launch by a single launch vehicle. The deployable modules 930 are disposed, in the launch configuration, in an upper (or forward) portion 900F of the stack. Similarly to implementations described above in connection with FIGS. 1-6, deployable module elements 910 and 920 may, following launch, be reconfigured from the stacked launch configuration of Detail AC to a side-by-side on-orbit configuration (Detail AD). One or more of the deployable module elements 910 and 920 may include robotic manipulators (not shown) to facilitate this reconfiguration.

In the illustrated implementation, six each deployable module elements 910 and six each deployable modules 920 are each located in the lower portion 900A of the stack. A first portion of the third plurality of deployable modules 930 may be associated with the spacecraft 901 and a second portion of the third plurality of deployable module elements 930 may be associated with the spacecraft 902. For example, in the illustrated implementation, deployable module elements 930(1), 930(2), and 930(3) are associated with the spacecraft 901 while deployable module elements 830(4), 830(5), and 830(6) are associated with the spacecraft 902. Thus in the on-orbit configuration illustrated by Detail AD, deployable module elements 930(1), 930(2), and 930(3) are coupled with the deployable module elements 910 of the spacecraft 901 while deployable module elements 930(4), 930(5), and 930(6) are coupled with the deployable module elements 920 of the spacecraft 902.

Advantageously, the deployable module elements 930 may be characteristically smaller than deployable module elements 910 and 920. For example, as illustrated, the deployable module elements 930 may have a characteristic dimension $\omega_1$, transverse to a longitudinal axis of the fairing 10000, whereas the deployable module elements 910 and/or 920 have a characteristic dimension $\omega_2$ transverse to the longitudinal axis of the fairing 10000. Advantageously, the characteristic dimension $\omega_2$ may be substantially larger than the characteristic dimension $\omega_1$. For example $\omega_2$ may be 20% or more larger than $\omega_1$. As a result, a total "stack height" of the launch vehicle payload may be increased, because the deployable module elements 930 fit within a tapered forward section of the launch vehicle fairing that has a diameter smaller than $\omega_2$. Thus, the present disclosure contemplates more efficient use of the volume within launch vehicle fairing 10000. Moreover, because the relatively small deployable module elements 830 may be lower mass than the relatively large deployable module elements 810 and/or 820, placing the small deployable module elements 830 on top of the stack may, advantageously, reduce the height of the center of gravity of the launch vehicle payload.

Figure 10:
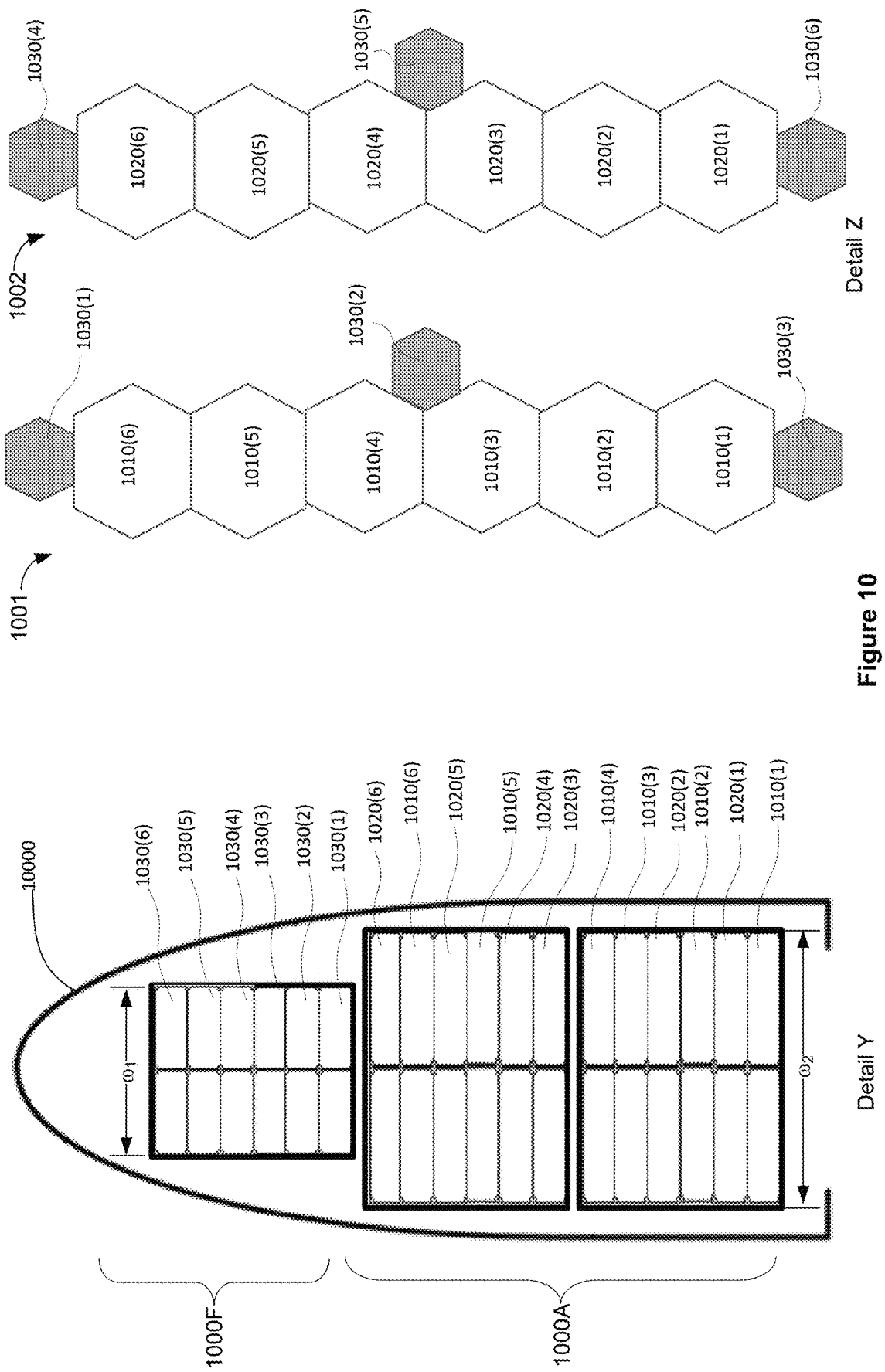
FIG. 10 illustrates a launch vehicle payload including a stack of deployable module elements in accordance with another implementation.

In the example illustrated in FIG. 9, the first plurality of deployable module elements 910 associated with a spacecraft 901 are depicted as being disposed in a lower region of the aft portion 900A whereas the second plurality of deployable module elements 920 associated with a spacecraft 902 are depicted as being disposed in an upper region of the aft portion 900A. As a result, each of the deployable module elements 920 is disposed forward of all of the deployable module elements 910. Other dispositions of the deployable module elements 910 and 920 are also contemplated however. For example, FIG. 10 illustrates a launch vehicle payload including a stack of deployable module elements in accordance with another implementation. In the example depicted in FIG. 10, an aft portion 1000A of the stack includes least one of the deployable module elements 1010 being disposed forward of a first subset of the deployable module elements 1020 and aft of a second subset of the deployable modules 1020. More particularly, in the illustrated example, it may be observed that deployable module element 1010(2) is disposed forward of deployable module element 1020(1) and aft of deployable module 1020(2).

The illustrated implementation may be advantageous for purposes of improving mass properties of the stack. For example, it is often desirable to minimize the height of the center of gravity of the stack. Accordingly, the deployable modules having the greatest mass are advantageously located near the bottom of the stack.

Thus, a self-assembling persistent platform has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
a plurality of deployable module elements, at least one of the deployable module elements including a robotic manipulator, the spacecraft being reconfigurable from a launch configuration to an on-orbit configuration, wherein:
in the launch configuration, the deployable module elements are disposed in a launch vehicle in a first arrangement;
in the on-orbit configuration, the deployable module elements are disposed in a second arrangement;
the spacecraft is self-assembled by the robotic manipulator reconfiguring the spacecraft from the launch configuration, through a transition configuration, to the on-orbit configuration; and
in the launch configuration, adjacent ones of the deployable module elements are releasably coupled with a first releasable coupling;

in the on-orbit configuration, the adjacent ones of the deployable module elements are releasably coupled with a second releasable coupling, different from the first releasable coupling in the transition configuration, both the first releasable coupling and the second releasable coupling are released.

2. The spacecraft of claim 1, wherein:
in the launch configuration, the deployable module elements are in a stacked arrangement; and
in the on-orbit configuration, the deployable module elements are in a side-by-side arrangement.

3. The spacecraft of claim 1, wherein at least one of the deployable module elements is a persistent bus services module.

4. The spacecraft of claim 1, wherein at least one of the deployable module elements is a propulsion module.

5. The spacecraft of claim 1, wherein at least two of the deployable module elements are replaceable payload modules.

6. A method comprising:
self-assembling an orbiting spacecraft from a launch configuration to an on-orbit configuration; and
operating the orbiting spacecraft in the on-orbit configuration, wherein:
  in the launch configuration, a plurality of deployable module elements are disposed in a launch vehicle in a stacked arrangement;
  in the on-orbit configuration, the deployable module elements are disposed in a side-by-side arrangement;
  at least one of the deployable module elements includes a robotic manipulator operable to reconfigure the orbiting spacecraft from the launch configuration, through a transition configuration, to the on-orbit configuration;
  in the stacked arrangement, adjacent ones of the deployable module elements are releasably coupled with a first releasable coupling;
  in the side-by-side arrangement, the adjacent ones of the deployable module elements are releasably coupled with a second releasable coupling; and
  in the transition configuration, both the first releasable coupling and the second releasable coupling are released.

7. The method of claim 6, wherein self-assembling the orbiting spacecraft includes using the robotic manipulator to reconfigure the spacecraft from the launch configuration, through the transition configuration, to the on-orbit configuration.

8. A system comprising:
a payload for a launch vehicle, the payload including a robotic manipulator and a payload stack including one or more deployable module elements and a plurality of spacecraft including at least a first spacecraft and a second spacecraft, wherein,
at least a first portion of the second spacecraft is disposed, in a launch configuration, forward of the first spacecraft;
at least one of the deployable module elements is disposed, in the launch configuration, in an upper portion of the payload stack, forward of the first portion of the second spacecraft;
the robotic manipulator is operable to reconfigure the payload from the launch configuration, through a transition configuration, to an on-orbit configuration;
in the on-orbit configuration, the at least one deployable module is coupled with the first spacecraft;

in the launch configuration, a first arrangement mechanically couples a first one of the deployable module elements to one or both of the first spacecraft and a second one of the deployable module elements;
in an on-orbit configuration, a second arrangement mechanically couples the first one of the deployable module elements with the second spacecraft; and
in a transition configuration, intermediate to the launch configuration and the on-orbit configuration, each of the first arrangement and the second arrangement is detached from the first one of the deployable module elements.

9. The system of claim 8, wherein:
at least one of the first spacecraft and the second spacecraft has a first characteristic width transverse to a longitudinal axis of the launch vehicle;
the at least one deployable module elements has a second characteristic width transverse to the longitudinal axis of the launch vehicle; and
the first characteristic width is substantially larger than the second characteristic width.

10. The system of claim 8, wherein:
at least one of the first spacecraft and the second spacecraft include a plurality of deployable module elements;
in the launch configuration, the plurality of deployable module elements is disposed in a launch vehicle in a stacked configuration such that a third arrangement mechanically couples adjacent ones of the plurality of module elements; and
in the on-orbit configuration, the plurality of deployable module elements is disposed in a side-by-side configuration such that a fourth arrangement mechanically couples adjacent module elements.

11. The system of claim 8, wherein:
a lower portion of the payload stack includes a first plurality and a second plurality of deployable module elements, the first plurality being associated with the first spacecraft, the second plurality being associated with the second spacecraft; and
an upper portion of the payload stack includes a third plurality and a fourth plurality of deployable module elements, the third plurality being associated with the first spacecraft, the fourth plurality being associated with the second spacecraft.

12. The system of claim 11, wherein:
the lower portion of the payload stack has a first characteristic width transverse to a longitudinal axis of the launch vehicle;
the upper portion of the payload stack has a second characteristic width transverse to the longitudinal axis of the launch vehicle;
and the first characteristic width is substantially larger than the second characteristic width.

13. The system of claim 11, wherein the first plurality of the deployable module elements is disposed in an aft region of the lower portion of the payload stack and the second plurality of the deployable module elements is disposed in a forward region of the lower portion of the payload stack.

14. The system of claim 11, wherein at least one of the first plurality of the deployable module elements is disposed forward of a first subset of the second plurality of deployable module elements and aft of a second subset of the second plurality of deployable module.

* * * * *